(12) United States Patent
Yuan et al.

(10) Patent No.: US 11,563,337 B2
(45) Date of Patent: Jan. 24, 2023

(54) HIGH EFFICIENCY WIRELESS CHARGING SYSTEM AND METHOD

(71) Applicant: NuVolta Technologies (Hefei) Co., Ltd., Hefei (CN)

(72) Inventors: Dongdong Yuan, Liji Town (CN); Sichao Liu, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 509 days.

(21) Appl. No.: 16/442,689

(22) Filed: Jun. 17, 2019

(65) Prior Publication Data

US 2020/0366120 A1 Nov. 19, 2020

(30) Foreign Application Priority Data

May 14, 2019 (CN) .......................... 201910400000.3

(51) Int. Cl.
| | |
|---|---|
| B60L 53/65 | (2019.01) |
| H02J 7/02 | (2016.01) |
| H02M 7/219 | (2006.01) |
| H02M 3/07 | (2006.01) |
| H02J 7/06 | (2006.01) |
| H02J 7/00 | (2006.01) |
| H02M 1/00 | (2006.01) |

(52) U.S. Cl.
CPC ................ *H02J 7/025* (2013.01); *H02J 7/00* (2013.01); *H02J 7/06* (2013.01); *H02M 3/07* (2013.01); *H02M 7/219* (2013.01); *H02J 2207/20* (2020.01); *H02M 1/007* (2021.05); *H02M 1/0045* (2021.05)

(58) Field of Classification Search
CPC .................................. H02J 7/025; H02M 3/07
USPC ......................................................... 320/108
See application file for complete search history.

(56) References Cited

U.S. PATENT DOCUMENTS

| | | | | |
|---|---|---|---|---|
| 8,937,825 B2* | 1/2015 | Lee | ........................ | H02M 7/217 |
| | | | | 363/89 |
| 11,205,921 B2* | 12/2021 | Hausman, Jr. | ............ | H02J 7/00 |
| 2011/0291613 A1* | 12/2011 | Rosik | ...................... | H02J 50/10 |
| | | | | 320/108 |
| 2012/0306284 A1* | 12/2012 | Lee | ...................... | H04B 5/0037 |
| | | | | 307/104 |
| 2014/0117771 A1* | 5/2014 | Kwon | ..................... | H02J 50/12 |
| | | | | 307/104 |
| 2014/0239930 A1* | 8/2014 | Wang | .................... | H02M 3/156 |
| | | | | 323/284 |
| 2014/0327390 A1 | 11/2014 | Park et al. | | |

(Continued)

FOREIGN PATENT DOCUMENTS

| | | | |
|---|---|---|---|
| CN | 101154894 A | | 4/2008 |
| CN | 202602381 U | | 12/2012 |

(Continued)

*Primary Examiner* — Suchin Parihar
(74) *Attorney, Agent, or Firm* — Slater Matsil, LLP

(57) ABSTRACT

A system includes a receiver coil configured to be magnetically coupled to a transmitter coil, a rectifier connected to the receiver coil, a first stage and a second stage connected in cascade between the rectifier and a load and a bias voltage source configured to be connected with a first voltage node through a first switch and a second voltage node through a second switch, wherein one of the first voltage node and the second voltage node supplies power to the bias voltage source.

20 Claims, 14 Drawing Sheets

(56) References Cited

U.S. PATENT DOCUMENTS

| | | | | |
|---|---|---|---|---|
| 2015/0364928 A1* | 12/2015 | Yen | ............... | H02M 3/07 |
| | | | | 320/108 |
| 2015/0372493 A1* | 12/2015 | Sankar | ............... | H02J 7/00308 |
| | | | | 307/104 |
| 2016/0268834 A1* | 9/2016 | Satyamoorthy | ............ | G05F 1/56 |
| 2021/0135593 A1* | 5/2021 | Feng | ............... | H02M 7/219 |

FOREIGN PATENT DOCUMENTS

| | | |
|---|---|---|
| CN | 105612688 A | 5/2016 |
| CN | 108233455 A | 6/2018 |
| CN | 109274147 A | 1/2019 |
| JP | 2014018031 A | 1/2014 |
| WO | 2018184015 A1 | 10/2018 |

* cited by examiner

HIGH EFFICIENCY WIRELESS CHARGING SYSTEM AND METHOD

PRIORITY CLAIM

This application claims priority to Chinese Patent Application No. 201910400000.3, filed on May 14, 2019, which is hereby incorporated by reference in its entirety.

TECHNICAL FIELD

The present invention relates to a charging system, and, in particular embodiments, to a high efficiency wireless charging system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As the power of the wireless power transfer system goes higher, there may be a need for achieving a high power wireless power transfer between the transmitter and the receiver. More particularly, achieving a high efficiency wireless power transfer under various input and output conditions (e.g., different load currents and/or different rated input voltages of the receiver) has become a significant issue. For example, in a high power application, the output voltage of the receiver rectifier is up to 20 V. The receiver bias voltage is about 5 V. Such a voltage difference between the output voltage of the receiver rectifier and the receiver bias voltage may cause significant power losses, thereby reducing the efficiency of the high power wireless power transfer system.

It would be desirable to have a high performance power receiver exhibiting good behaviors such as high efficiency under a variety of input and output conditions.

SUMMARY

These and other problems are generally solved or circumvented, and technical advantages are generally achieved, by preferred embodiments of the present disclosure which provide a high efficiency wireless charging system.

In accordance with an embodiment, an apparatus comprises a rectifier configured to convert an alternating current voltage into a direct current voltage, a first stage and a second stage connected in cascade between the rectifier and a load and a bias voltage source coupled to the rectifier through a first linear regulator and a first switch, and coupled to the load through a second switch.

In accordance with another embodiment, a method comprises detecting an output voltage of a wireless charging system, wherein the wireless charging system comprises a rectifier, a first power stage and a second power stage connected in cascade, and wherein an output of the wireless charging system is configured to be connected to a battery, connecting a bias voltage source of the wireless charging system to a voltage potential higher than the output voltage of the wireless charging system when the output voltage of the wireless charging system is less than a first predetermined threshold and connecting the bias voltage source of the wireless charging system to the output voltage of the wireless charging system when the output voltage of the wireless charging system is greater than the first predetermined threshold.

In accordance with yet another embodiment, a system comprises a receiver coil configured to be magnetically coupled to a transmitter coil, a rectifier connected to the receiver coil, a first stage and a second stage connected in cascade between the rectifier and a load and a bias voltage source configured to be connected with a first voltage node through a first switch and a second voltage node through a second switch, wherein one of the first voltage node and the second voltage node supplies power to the bias voltage source.

An advantage of an embodiment of the present disclosure is a high efficiency wireless charging system capable of supplying a bias voltage source from different voltage potentials.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high efficiency wireless charging system. The disclosure may also be applied, however, to a variety of power systems. Hereinafter, various embodiments will be explained in detail with reference to the accompanying drawings.

Figure 1:
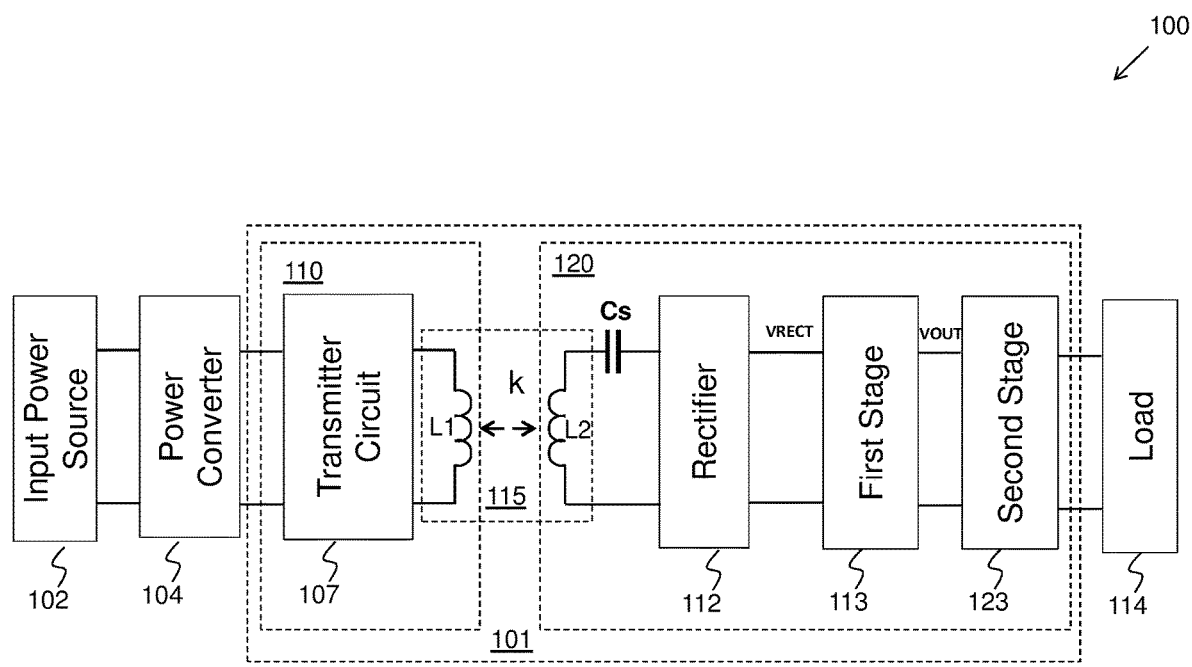
FIG. 1 illustrates a block diagram of a wireless charging system in accordance with various embodiments of the present disclosure.

FIG. 1 illustrates a block diagram of a wireless charging system in accordance with various embodiments of the present disclosure. The wireless charging system 100 comprises a power converter 104 and a wireless power transfer device 101 connected in cascade between an input power source 102 and a load 114. In some embodiments, the power converter 104 is employed to further improve the performance of the wireless charging system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112, a first power stage 113 and a second power stage 123 connected in cascade. Throughout the description, the first power stage 113 may be alternatively referred to as the first power converter 113. Likewise, the second power stage 123 may be alternatively referred to as the second power converter 123.

As shown in FIG. 1, the resonant capacitor Cs is connected in series with the receiver coil L2 and further connected to the inputs of the rectifier 112. The outputs of the rectifier 112 are connected to the inputs of the first power converter 113. The outputs of the first power converter 113 are connected to the inputs of the second power converter 123. The outputs of the second power converter 123 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

The rectifier 112 converts an alternating polarity waveform received from the output of the receiver coil L2 to a single polarity waveform. In some embodiments, the rectifier 112 comprises a full-wave diode bridge, an output capacitor and a switch (e.g., a load switch). In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The first power converter 113 and the second power converter 123 are coupled between the rectifier 112 and the load 114. The first power converter 113 and the second power converter 123 are non-isolated power converters connected in cascade. In some embodiments, the first power converter 113 is implemented as a linear regulator. The second power converter 123 may be implemented as an isolation switch. Alternatively, the first power converter 113 may be implemented as a buck converter. The second power converter 123 may be implemented as a charge pump converter. Furthermore, the first power converter 113 may be implemented as a hybrid power converter configured to operate in different modes for efficiently charging the load 114. The second power converter 123 is implemented as a charge pump power converter configured as a voltage divider.

In some embodiments, both the first power converter 113 and the second power converter 123 are implemented as charge pump power converters configured as voltage dividers respectively. The input voltage of the first power converter 113 is two times as much as the input voltage of the second power converter 123. The input voltage of the second power converter 123 is two times as much as the voltage applied to the load 114 (e.g., a battery). In other words, the voltage at VRECT is four times as much as the voltage applied to the load 114. Such a high voltage helps to reduce the current flowing through the receiver coil L2. In some embodiments, the voltage at VRECT is in a range from about 5 V to about 20 V. Furthermore, the resolution of the voltage regulation of VRECT is equal to or less than about 200 mV.

One advantageous feature of having the first power converter 113 and the second power converter 123 is that a higher output voltage (e.g., 20 V) can be achieved at the output of the rectifier 112 (VRECT in FIG. 1). Such a higher output voltage helps to lower down the current flowing through the receiver coil L2, thereby improving the efficiency of the power receiver 120.

Figure 2:
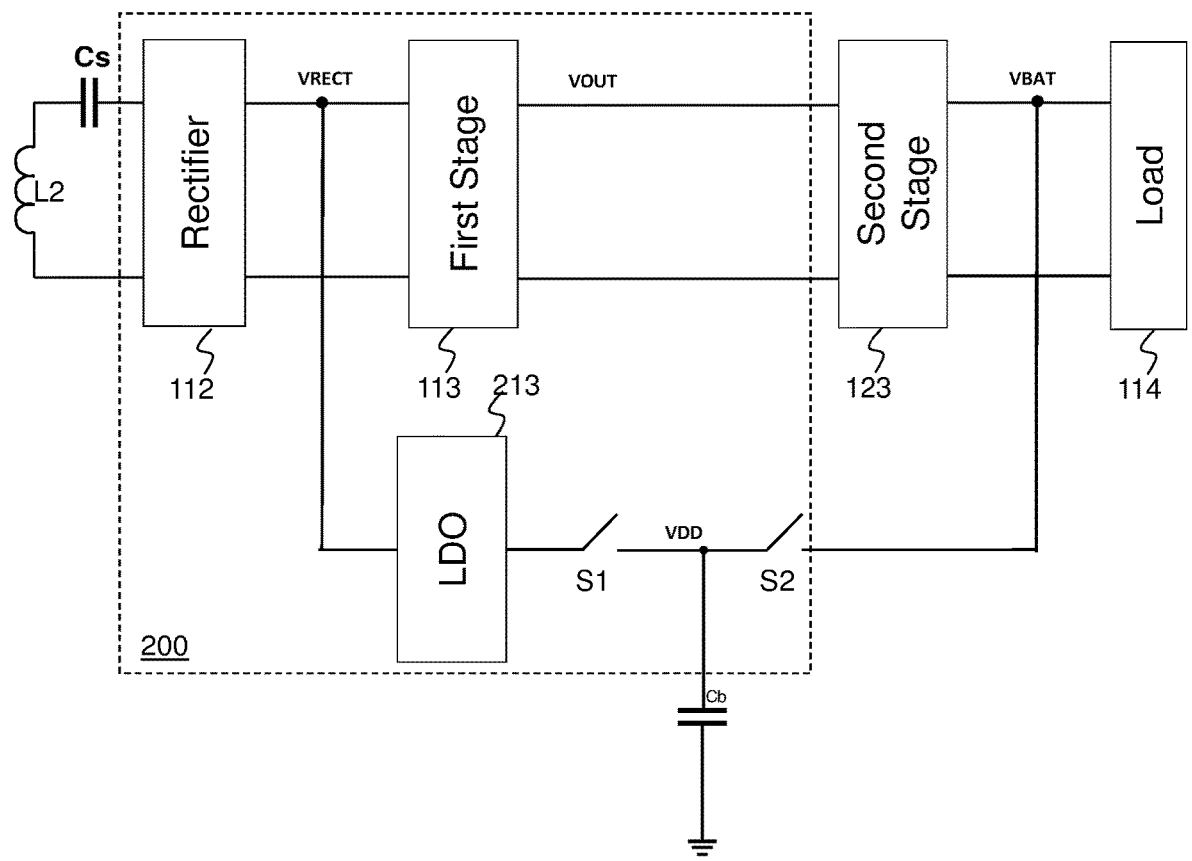
FIG. 2 illustrates a block diagram of a first implementation of the wireless charging system shown in FIG. 1 in accordance with various embodiments of the present disclosure.

FIG. 2 illustrates a block diagram of a first implementation of the wireless charging system shown in FIG. 1 in accordance with various embodiments of the present disclosure. FIG. 2 shows a block diagram of the power receiver of the wireless charging system 100 shown in FIG. 1. The rectifier 112, the first power stage 113 and the second power stage 123 are connected in cascade between the receiver coil L2 and the load 114. A bias voltage source VDD is employed to provide power for the control circuit of the power receiver. As shown in FIG. 2, the output of the rectifier 112 is denoted as VRECT. The output of the first power stage 113 is denoted as VOUT. The output of the second power stage 123 is denoted as VBAT.

As shown in FIG. 2, a bias capacitor Cb is connected between the bias voltage source VDD and ground. The bias voltage source VDD is connected to the voltage node VRECT through a low dropout (LDO) regulator 213 and a switch S1. In addition, the bias voltage source VDD is connected to voltage node VBAT through a switch S2. Throughout the description, the LDO regulator may be alternatively referred to as a linear regulator or a LDO. The voltage node VBAT may be alternatively referred to as the output of the second power stage 123.

In some embodiments, the first power stage 113 is implemented as a linear regulator. In alternative embodiments, the first power stage 113 may be implemented as any suitable power conversion devices such as a buck converter, a four-switch buck-boost converter, a charge pump converter, a hybrid power converter and the like. The second power stage 123 may be implemented as any suitable power conversion devices such as an isolation switch, a charge pump converter, a battery charger and the like. It should be noted that any combinations of the first power stage 113 (various implementations described above) and the second power stage 123 (various implementations described above) are within the scope of the present disclosure.

In some embodiments, the first linear regulator and the switch S1 are formed by a first transistor and a second transistor back-to-back connected to each other. The switch S2 is formed by a third transistor and a fourth transistor back-to-back connected to each other. The detailed schematic diagram of the first linear regulator and switches S1 and S2 will be described below with respect to FIG. 3.

In operation, the bias voltage source VDD is configured to receive power from two different sources, namely voltage node VRECT and voltage node VBAT. When the output voltage of the second power stage 123 is less than a predetermined threshold (e.g., 3.3V), the switch S1 is turned on and the switch S2 is turned off. As a result of turning on S1 and turning off S2, the power is supplied from the output of the rectifier 112 to the bias voltage source VDD through the LDO 213. The LDO 213 is employed to regulate the voltage of the bias voltage source VDD. In some embodiments, the bias voltage source VDD is equal to 5 V. On the other hand, when the output voltage of the second power stage 123 is greater than the predetermined threshold (e.g., 3.3V), the switch S1 is turned off and the switch S2 is turned on. As a result of turning off S1 and turning on S2, the power is supplied from the output of the second power stage 123 to the bias voltage source VDD. The voltage of the bias voltage source VDD is equal to the output voltage of the second power stage 123.

FIG. 2 shows the rectifier 112, the first power stage 113, the LDO 213, the switches S1 and S2 are within a dashed box 200. In some embodiments, the devices in the dashed box 200 may be fabricated on a single semiconductor die. In alternative embodiments, the devices in the dashed box 200 may be fabricated on a single lead frame and packaged in a same semiconductor chip. It should be noted that depending on different applications and design needs, some passive components (e.g., inductor) may be placed outside the semiconductor chip.

Figure 3:
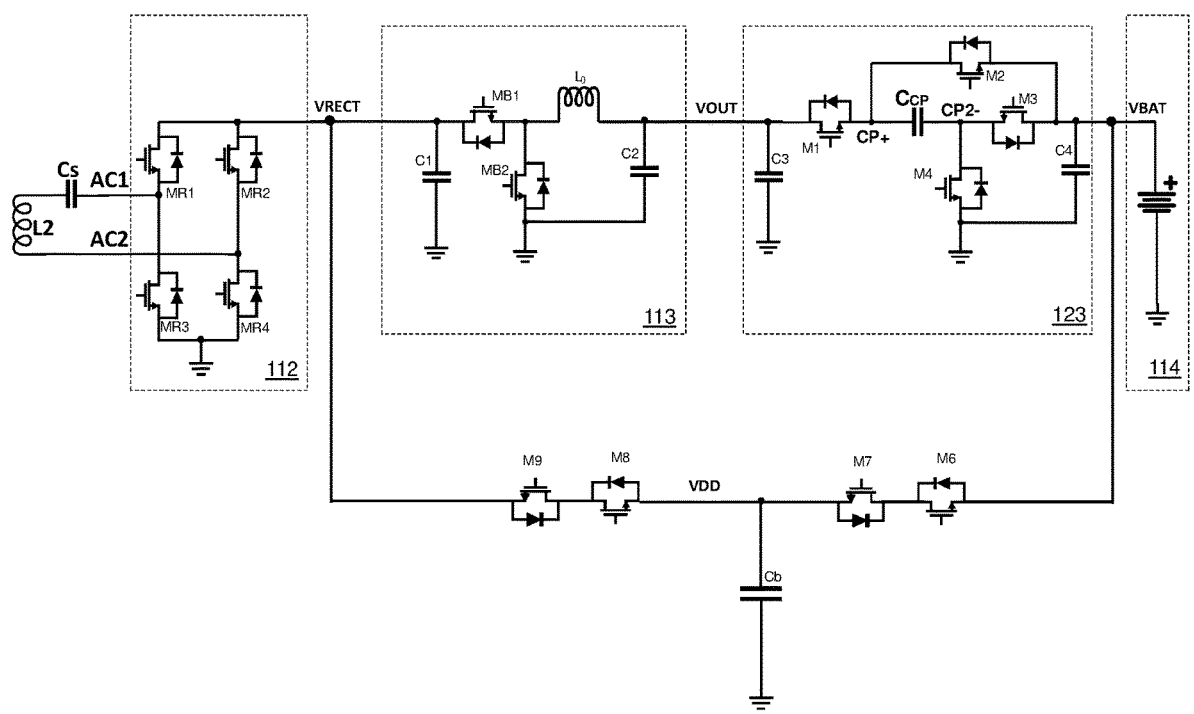
FIG. 3 illustrates a schematic diagram of a first implementation of the receiver shown in FIG. 2 in accordance with various embodiments of the present disclosure.

FIG. 3 illustrates a schematic diagram of a first implementation of the receiver shown in FIG. 2 in accordance with various embodiments of the present disclosure. The receiver comprises the receiver coil L2, the receiver resonant capacitor Cs, the rectifier 112, the first power stage 113 and the second power stage 123. As shown in FIG. 3, the receiver resonant capacitor Cs, the rectifier 112, the first power stage 113 and the second power stage 123 are connected in cascade between the receiver coil L2 and the load 114. In some embodiments, the load 114 is a rechargeable battery. Throughout the description, the load 114 may be alternatively referred to as a battery.

In some embodiments, the rectifier 112 is implemented as a full-wave rectifier as shown in FIG. 3. The rectifier 112 includes four switching elements, namely MR1, MR2, MR3 and MR4. As shown in FIG. 3, the switching elements MR1 and MR3 are connected in series between the output terminal of the rectifier 112 and ground. Likewise, the switching elements MR2 and MR4 are connected in series between the output terminal of the rectifier 112 and ground. As shown in FIG. 3, the common node AC1 of the switching elements MR1 and MR3 is coupled to a first input terminal of the receiver coil L2 through the receiver resonant capacitor Cs. The common node AC2 of the switching elements MR2 and MR4 is coupled to a second input terminal of the receiver coil L2.

It should be noted that while the example throughout the description is based upon a full-wave rectifier (e.g., full-wave rectifier 112 shown in FIG. 3), the implementation of the power receiver 120 shown in FIG. 3 may have many variations, alternatives, and modifications. For example, half-wave rectifiers may be alternatively employed.

In sum, the full-wave rectifier 112 illustrated herein is limited solely for the purpose of clearly illustrating the inventive aspects of the various embodiments. The present disclosure is not limited to any particular power topology.

It should further be noted that while FIG. 3 illustrates four switches MR1-MR4, various embodiments of the present disclosure may include other variations, modifications and alternatives. For example, additional switching elements may be connected in parallel with each switch of the full-wave rectifier 112. The additional switching elements help to improve the efficiency of the rectifier 112.

It should further be noted the rectifier structure shown in FIG. 3 is merely an example. One person skilled in the art will recognize many alternatives, variations and modification. For example, the four switches MR1, MR2, MR3 and MR4 may be replaced by four diodes.

The output of the rectifier 112 is connected to a capacitor C1. The capacitor C1 functions as an output capacitor of the rectifier 112 and an input capacitor of the first power stage 113. The capacitor C1 is employed to attenuate noise and provide a steady output voltage at the output of the rectifier 112.

The first power stage 113 is implemented as a step-down power converter (also known as a buck converter). The first power stage 113 includes a first switch MB1, a second switch MB2, an inductor Lo and an output capacitor C2. As shown in FIG. 3, the first switch MB1 and the second switch MB2 are connected in series between the output VRECT of the rectifier 112 and ground. The inductor Lo is connected between the common node of the first switch MB1 and the second switch MB2, and the output capacitor C2.

In some embodiments, both the first switch MB1 and the second switch MB2 are implemented as an n-type transistors as shown in FIG. 3. The gate of the first switch MB1 and the gate of the second switch MB2 are configured to receive gate drive signals generated by a controller (not shown).

It should be noted that the first power stage 113 shown in FIG. 3 is merely an example, which should not unduly limit the scope of the claims. One of ordinary skill in the art would recognize many variations, alternatives, and modifications. For example, the first switch MB1 may be implemented as a p-type transistor.

The second power stage 123 is implemented as a charge pump converter. The second power stage 123 comprises an input capacitor C3, a first switch M1, a capacitor $C_{CP}$, a second switch M2, a third switch M3, a fourth switch M4 and an output capacitor C4. The first switch M1, the capacitor $C_{CP}$ and the third switch M3 are connected in series between the output terminal of the first power stage 113 and the battery 114. A common node of the first switch M1 and the capacitor $C_{CP}$ is denoted as CP+ as shown in FIG. 3. Likewise, a common node of the third switch M3 and the capacitor $C_{CP}$ is denoted as CP−. A common node of the second switch M2 and the output capacitor C4 is denoted as VBAT. As shown in FIG. 3, the second switch M2 is connected between CP+ and VBAT. The fourth switch M4 is connected between CP− and ground.

In some embodiments, the second power stage 123 functions as a charge pump power converter. The charge pump power converter operates in two different phases. During the first phase of the charge pump mode, switches M1 and M3 are turned on, and switches M2 and M4 are turned off. Since switches M1 and M3 are turned on, a first conductive path is established between VOUT and VBAT. The first conductive path is formed by switch M1, the charge pump capacitor $C_{CP}$ and switch M3. The current flows from VOUT to VBAT through the first conductive path. During the first phase of the charge pump mode, the charge pump capacitor $C_{CP}$ is charged and energy is stored in the charge pump capacitor $C_{CP}$ accordingly.

During the second phase of the charge pump mode, switches M1 and M3 are turned off, and switches M2 and M4 are turned on. Since switches M2 and M4 are turned on, a second conductive path is established. The second conductive path is formed by switch M4, the charge pump capacitor $C_{CP}$ and switch M2. During the second phase of the charge pump mode, the current discharges the charge pump capacitor $C_{CP}$ and the energy stored in the charge pump capacitor $C_{CP}$ decreases accordingly.

In operation, the first power stage 113 functions as a charging apparatus for charging the battery 114. More particularly, during the process of charging the battery 114, the first power stage 113 may be configured to operate in a current control mode in which the resolution of the current regulation is equal to or less than about 400 mA. Furthermore, the first power stage 113 may be configured to operate in a voltage control mode in which the resolution of the voltage regulation is equal to or less than about 40 mV.

As shown in FIG. 3, the bias voltage source VDD is coupled to the voltage node VRECT through MOSFETs M8 and M9 Likewise, the bias voltage source VDD is coupled to the voltage node VBAT through MOSFETs M7 and M6.

In some embodiments, the FET M9 may function as a linear regulator. More particularly, the gate drive voltage of the FET M9 may be controlled such that the voltage at VDD is regulated. In some embodiments, the controller of the wireless charging system 100 keeps reducing the gate drive voltage of the FET M9 until the bias voltage VDD is equal to the specified value of the bias voltage source VDD (e.g., 5 V).

The switch S1 shown in FIG. 2 is implemented as M8. The switch S2 is implemented as two back-to-back connected transistors M6 and M7. As shown in FIG. 3, switches M6 and M7 are back-to-back connected to each other. The back-to-back connected M6 and M7 form an isolation switch between the bias voltage source VDD and the battery 114.

According to some embodiments, the switching elements MR1, MR2, MR3, MR4, MB1, MB2, M1, M2, M3, M4, M6, M7, M8 and M9 are implemented as MOSFET or MOSFETs connected in parallel, any combinations thereof and/or the like. According to alternative embodiments, the switching elements (e.g., switch MR1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

Figure 4:
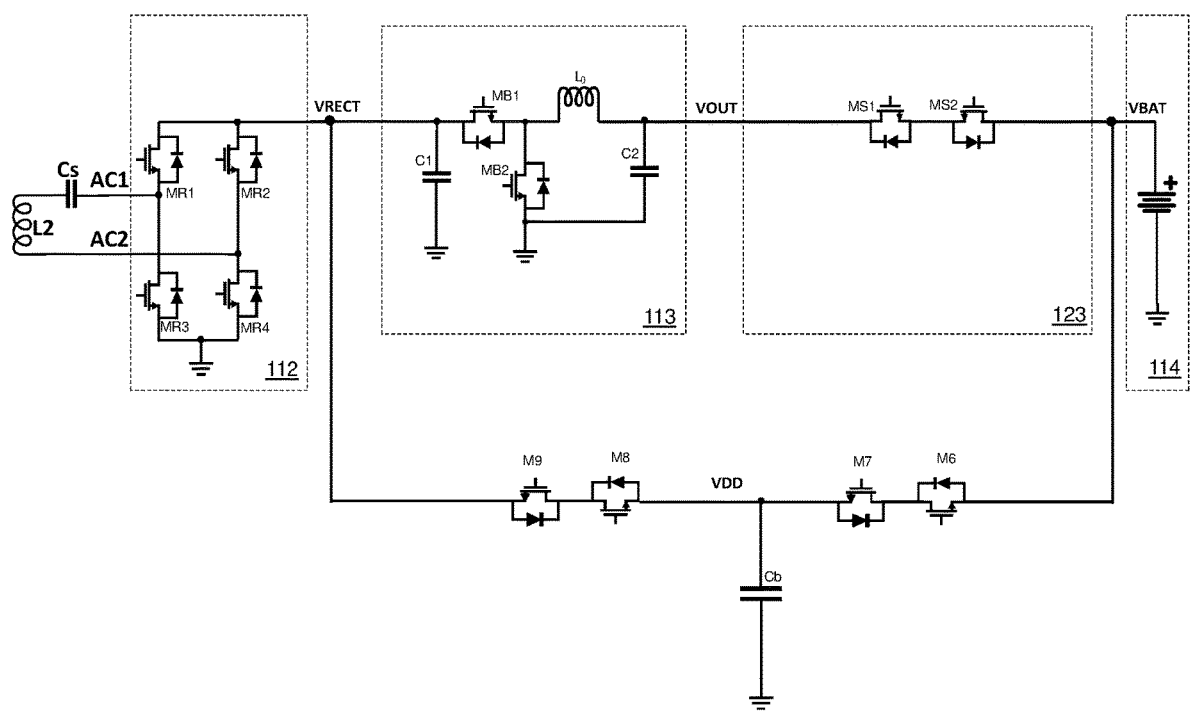
FIG. 4 illustrates a schematic diagram of a second implementation of the receiver shown in FIG. 2 in accordance with various embodiments of the present disclosure.

FIG. 4 illustrates a schematic diagram of a second implementation of the receiver shown in FIG. 2 in accordance with various embodiments of the present disclosure. The power receiver 120 shown in FIG. 4 is similar to that shown in FIG. 3 except that the second power stage 123 is implemented as an isolation switch. As shown in FIG. 4, the isolation switch includes a first switch MS1 and a second switch MS2. The first switch MS1 and the second switch MS2 are back-to-back connected, thereby providing isolation between the first power stage 113 and the battery 114.

Figure 5:
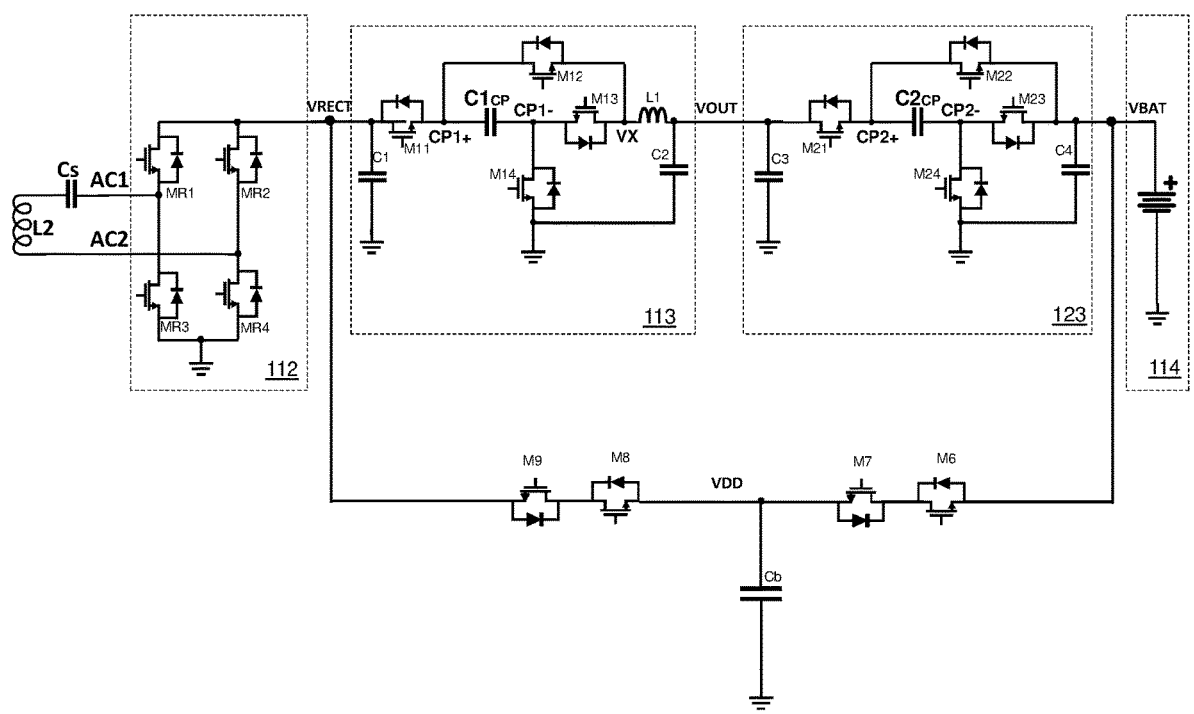
FIG. 5 illustrates a schematic diagram of a third implementation of the receiver shown in FIG. 2 in accordance with various embodiments of the present disclosure.

FIG. 5 illustrates a schematic diagram of a third implementation of the receiver shown in FIG. 2 in accordance with various embodiments of the present disclosure. The wireless charging system shown in FIG. 5 is similar to that shown in FIG. 3 except that the first power converter 113 is implemented as a hybrid converter. Throughout the description, the first power converter 113 may be alternatively referred to as the hybrid converter 113.

As shown in FIG. 5, the hybrid converter 113 comprises switches M11-M14, a capacitor $C1_{CP}$, an output inductor L1 and an output capacitor C2. As shown in FIG. 5, the output inductor L1 and the output capacitor C2 form an output filter. The switch M11, the capacitor $C1_{CP}$ and the switch M13 are connected in series between VRECT and the output filter. A common node of the switch M11 and the capacitor $C1_{CP}$ is denoted as CP1+ as shown in FIG. 5. Likewise, a common node of the switch M13 and the capacitor $C1_{CP}$ is denoted as CP1−. A common node of the switch M13 and the output filter is denoted as VX. As shown in FIG. 5, the switch M12 is connected between CP1+ and VX. The switch M14 is connected between CP1− and ground.

In some embodiments, the capacitor $C1_{CP}$ functions as a charge pump capacitor. Throughout the description, the capacitor $C1_{CP}$ is alternatively referred to as the charge pump capacitor $C1_{CP}$.

The hybrid converter 113 may operate in three different operating modes, namely a hybrid mode, a charge pump mode and a buck mode. In the hybrid mode, the hybrid converter 113 operates in four different phases. In each phase, the current flowing through the output inductor L1 may ramp up or down depending on different combinations of the input voltage VRECT, the voltage across the charge pump capacitor $C1_{CP}$ and the output voltage VOUT. In the hybrid mode, the voltage of the hybrid converter 113 can be regulated to a predetermined voltage. Since the hybrid converter 113 under the hybrid mode has tight voltage regulation, the output voltage of the wireless charging system 100 may be regulated through regulating the output voltage of the hybrid converter 113.

In the charge pump mode, the hybrid converter 113 operates in two different phases. In the charge pump mode, the hybrid converter 113 functions as a charge pump converter, which has been described in detail above, and hence is not discussed herein again.

In the buck mode, the hybrid converter 113 operates in two different phases. The switch M12 and the switch M13 are always-on. As a result, the charge pump capacitor $C1_{CP}$ is shorted and is not part of the operation of the buck mode. In each phase, the current flowing through the output inductor L1 may ramp up or down depending on different combinations of the input voltage VRECT and the output voltage VOUT. Furthermore, in order to have a smooth transition between the buck mode and the charge pump mode, the hybrid converter 113 may operate in an auto mode. In the auto mode, the charge pump capacitor is floating when the buck mode is applicable to the hybrid converter 113.

Figure 6:
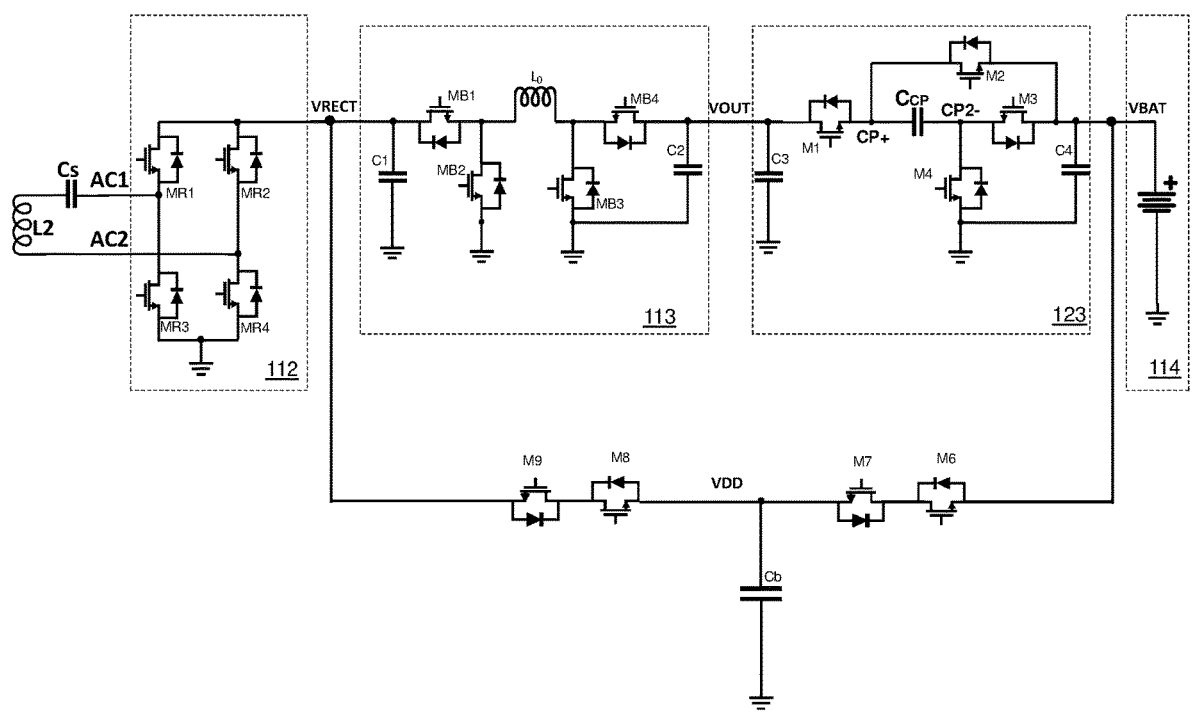
FIG. 6 illustrates a schematic diagram of a fourth implementation of the receiver shown in FIG. 2 in accordance with various embodiments of the present disclosure.

FIG. 6 illustrates a schematic diagram of a fourth implementation of the receiver shown in FIG. 2 in accordance with various embodiments of the present disclosure. The wireless charging system shown in FIG. 6 is similar to that shown in FIG. 3 except that the first power converter 113 is implemented as a four-switch buck-boost converter.

As shown in FIG. 6, the buck-boost converter comprises a first high-side switch MB1, a first low-side switch MB2, a second low-side switch MB3, a second high-side switch MB4 and an inductor Lo. The first high-side switch MB1 and the first low-side switch MB2 are connected in series between VRECT and ground. The second high-side switch MB4 and the second low-side switch MB3 are connected in series between VOUT and ground. The inductor Lo is coupled between the common node of the first high-side switch MB1 and the first low-side switch MB2, and the common node of the second high-side switch MB4 and the second low-side switch MB3 as shown in FIG. 6.

The buck-boost converter may be divided into two portions, namely a buck converter portion and a boost converter portion. The buck converter portion may comprise the first high-side switch MB1 and the first low-side switch MB2. The buck converter portion and the inductor Lo may function as a step-down converter when the second high-side switch MB4 is always on and the second low-side switch MB3 is always off. Under such a configuration, the buck-boost converter operates in a buck mode.

The boost converter portion of the buck-boost converter may comprise the second high-side switch MB4 and second low-side switch MB3. The boost converter portion and the inductor Lo may function as a step-up converter when the first high-side switch MB1 is always on and the first low-side switch MB2 is always off. Under such a configuration, the buck-boost converter operates in a boost mode. Furthermore, the buck-boost converter operates in a pass-through mode when the high-side switches MB1 and MB4 are always on, and the low-side switches MB2 and MB3 are always off.

The switches (e.g., the first high-side switch MB1) shown in FIG. 6 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

Based upon different application needs, the buck-boost converter may be configured to operate in three different operating modes, namely the buck mode, the boost mode and the pass-through mode.

It should be noted that while FIG. 6 shows the second power stage 123 is implemented as a charge pump converter, the four-switch buck-boost converter shown in FIG. 6 can be combined with any implementations of the second power stage 123. For example, when the first power stage 113 is implemented as a four-switch buck-boost converter, the second power stage 123 can be any suitable implementations such as the charge pump power converter shown in FIG. 6, the isolation switch shown in FIG. 4 and any combinations thereof.

Figure 7:
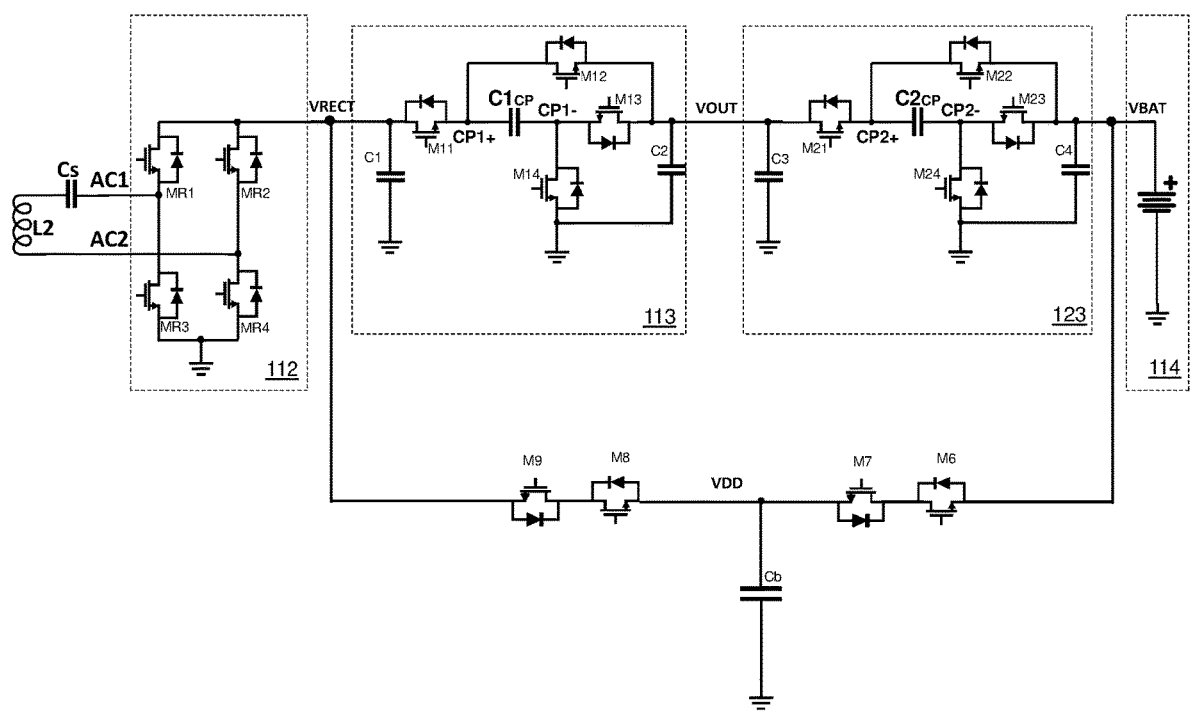
FIG. 7 illustrates a schematic diagram of a fifth implementation of the receiver shown in FIG. 2 in accordance with various embodiments of the present disclosure.

FIG. 7 illustrates a schematic diagram of a fifth implementation of the receiver shown in FIG. 2 in accordance with various embodiments of the present disclosure. Both the first power stage 113 and the second power stage 123 are implemented as charge pump power converters. As shown in FIG. 7, the first power converter 113 comprises an input capacitor C1, an output capacitor C2, a charge pump capacitor $C1_{CP}$ and a plurality of switches M11-M14. The second power converter 123 comprises an input capacitor C3, an output capacitor C4, a charge pump capacitor $C2_{CP}$ and a plurality of switches M21-M24. The operating principle of the charge pump converter has been described above with respect to FIG. 3, and hence is not discussed herein.

In operation, in order to improve the EMI performance of the wireless charging system 100, the leading edge of the gate drive signal of the switch M11 is aligned with the leading edge of the gate drive signal of the switch M21. Such an alignment between the gate drive signal of the first power converter 113 and the second power converter 123 helps to improve the EMI performance of the wireless charging system 100.

Figure 8:
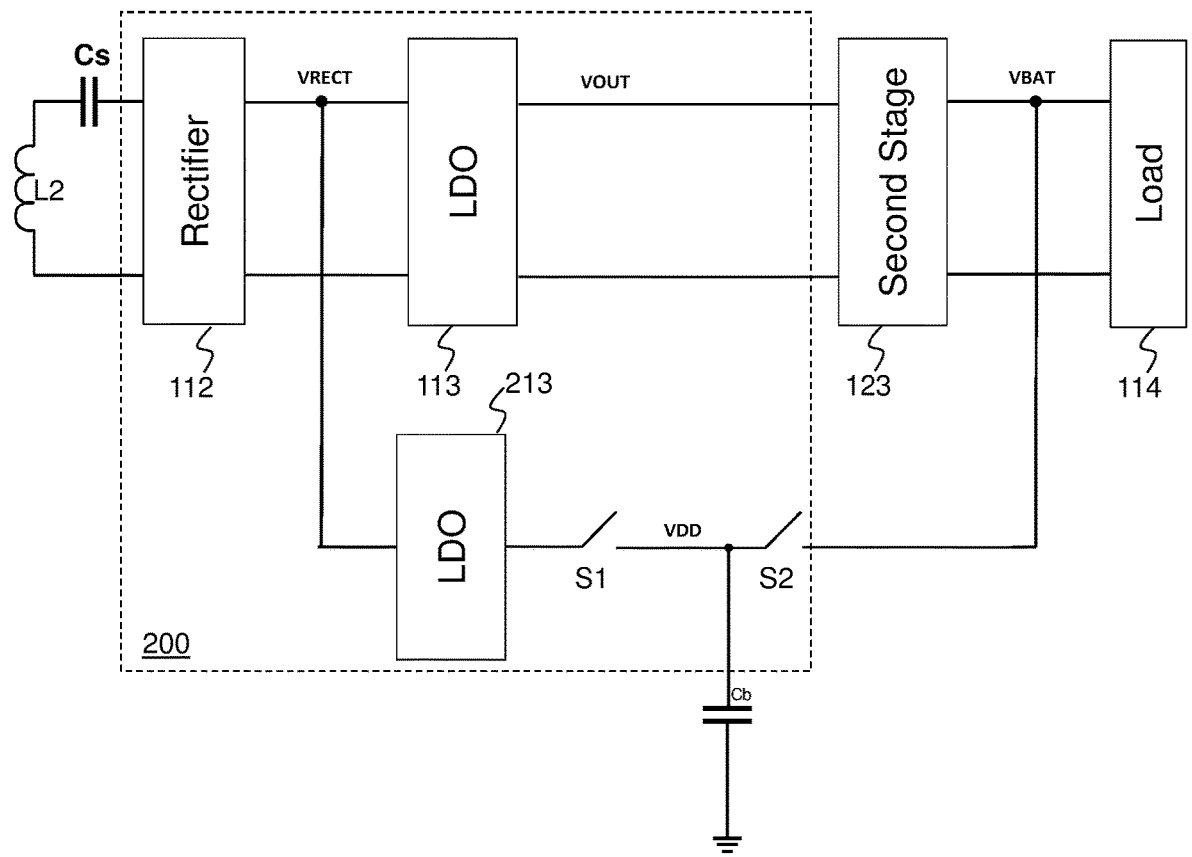
FIG. 8 illustrates a block diagram of a second implementation of the wireless charging system shown in FIG. 1 in accordance with various embodiments of the present disclosure.

FIG. 8 illustrates a block diagram of a second implementation of the wireless charging system shown in FIG. 1 in accordance with various embodiments of the present disclosure. The wireless charging system shown in FIG. 8 is similar to that shown in FIG. 2 except that the first power stage 113 is implemented as a linear regulator. The linear regulator is a low dropout linear regulator. In some embodiments, this LDO regulator may comprise a p-type transistor and the associated control circuit. In alternative embodiments, this LDO regulator may comprise an n-type transistor and the associated control circuit. The structure and operation principle of LDO regulators are well known, and hence are not discussed herein.

Figure 9:
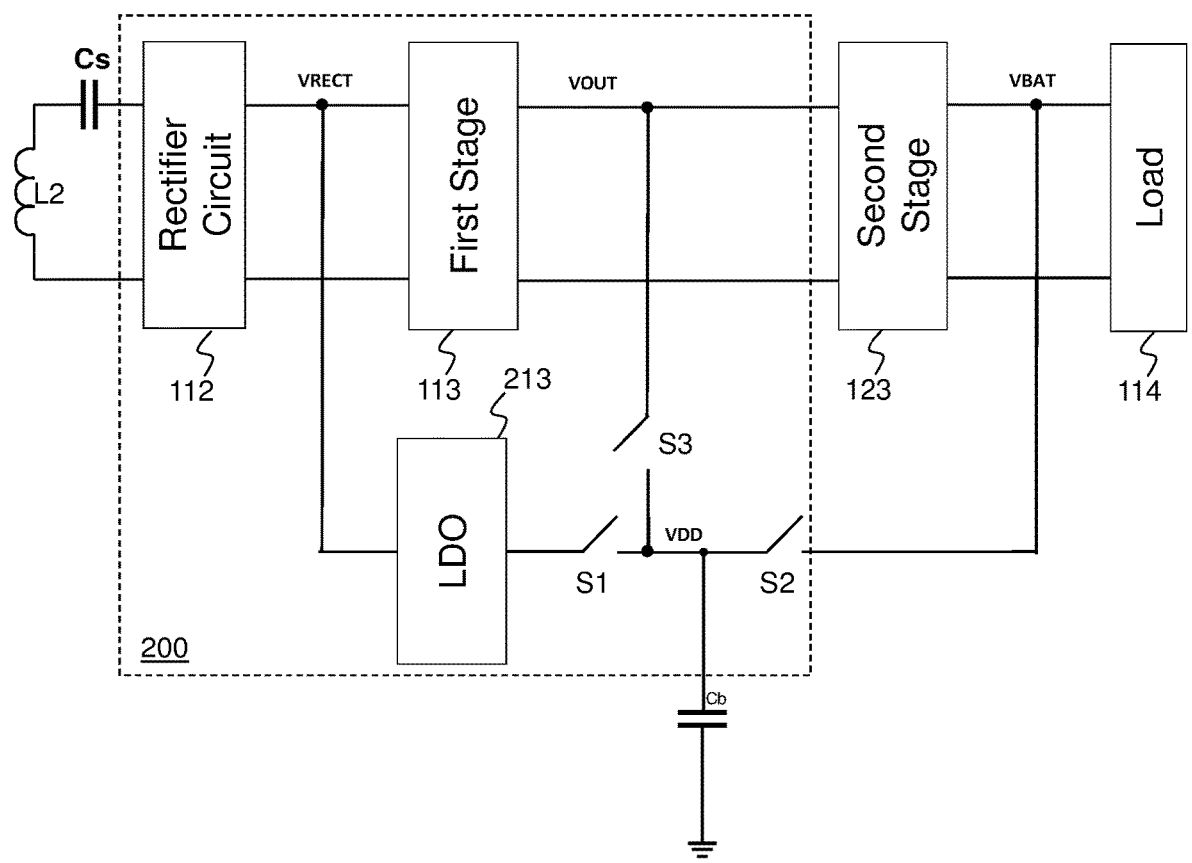
FIG. 9 illustrates a block diagram of a third implementation of the wireless charging system shown in FIG. 1 in accordance with various embodiments of the present disclosure.

FIG. 9 illustrates a block diagram of a third implementation of the wireless charging system shown in FIG. 1 in accordance with various embodiments of the present disclosure. The wireless charging system shown in FIG. 9 is similar to that shown in FIG. 2 except that the bias voltage source VDD is supplied by three different power sources. As shown in FIG. 9, a switch S3 is connected between the output of the first power stage 113 and the bias voltage source VDD. In some embodiments, the switch S3 is implemented as an isolation switch formed by two transistors back-to-back connected to each other.

In operation, when the output voltage of the first power stage 113 is less than a first predetermined threshold, the bias voltage source VDD is connected to the output of the rectifier 112 through the linear regulator 213 and the switch S1. The bias voltage source is supplied by the output of the rectifier 112.

As the output voltage of the first power stage 113 further increases, the bias voltage source VDD is connected to the output of the first power stage 113 through the switch S3 when the output voltage of the first power stage 113 is greater than the first predetermined threshold and the output voltage of the wireless charging system 100 is less than the second predetermined threshold (e.g., 3.5 V).

As the output voltage of the second power stage 123 increases, the bias voltage source VDD is supplied by the output of the second power stage 123. In particular, switches S1 and S3 are turned off, and switch S2 is turned on. The bias voltage source VDD is connected to the output voltage of the wireless charging system through the switch S2 when the output voltage of the wireless charging system is greater than the second predetermined threshold (e.g., 3.5 V). The bias voltage source VDD is supplied by the output of the wireless charging system.

One advantageous feature of having the switch S3 is using VOUT to replace VRECT for providing power to the bias voltage source VDD helps to reduce the bias power loss. As a result, the system efficiency can be further improved.

Figure 10:
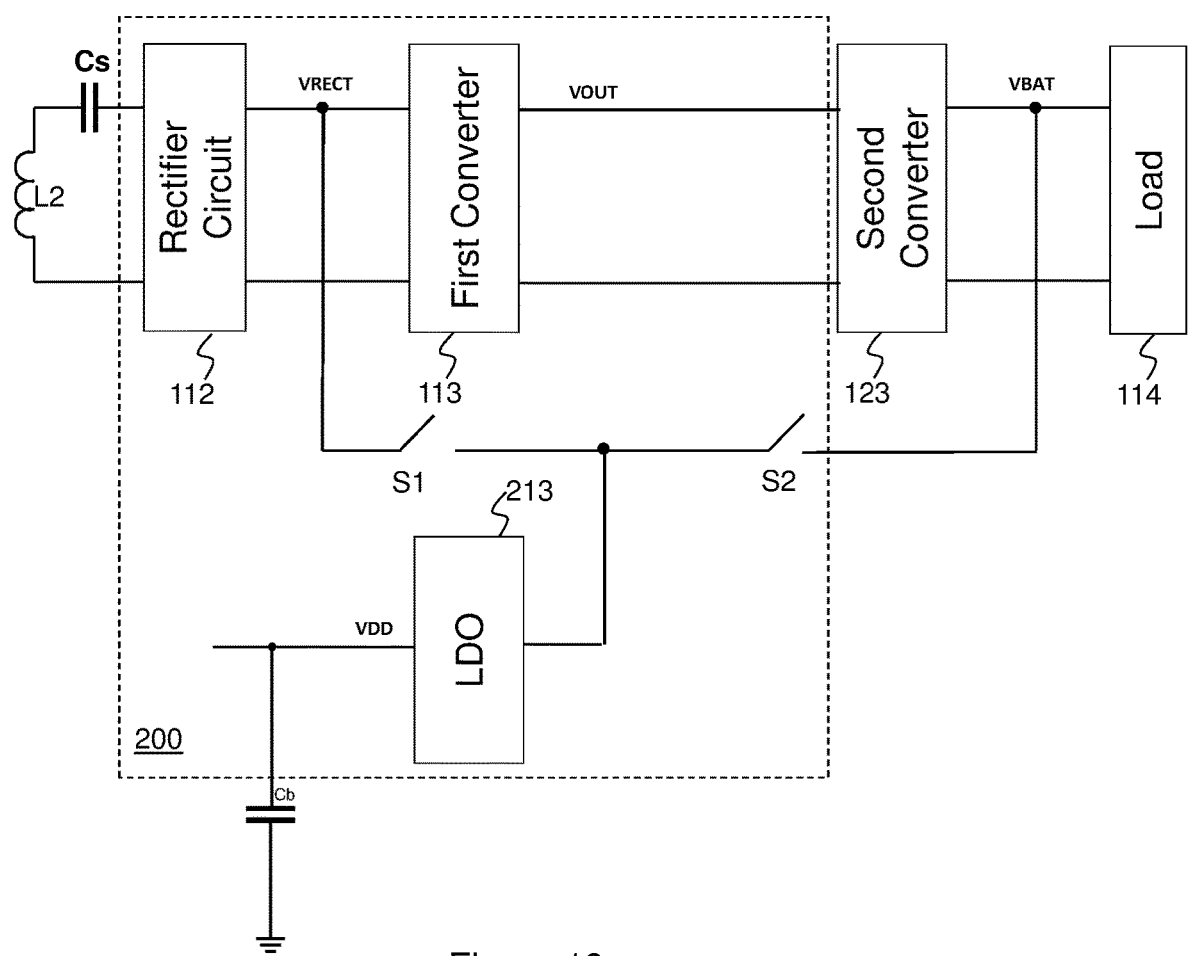
FIG. 10 illustrates a block diagram of a fourth implementation of the wireless charging system shown in FIG. 1 in accordance with various embodiments of the present disclosure.

FIG. 10 illustrates a block diagram of a fourth implementation of the wireless charging system shown in FIG. 1 in accordance with various embodiments of the present disclosure. The wireless charging system shown in FIG. 10 is similar to that shown in FIG. 2 except that the LDO 213 is shared by the two power delivery paths. In some embodiments, the output voltage of the second converter 123 may be higher than the maximum voltage of the bias voltage source VDD. The LDO 213 is employed to reduce the output voltage of the second converter 123 to a level suitable for the bias voltage source VDD.

Figure 11:
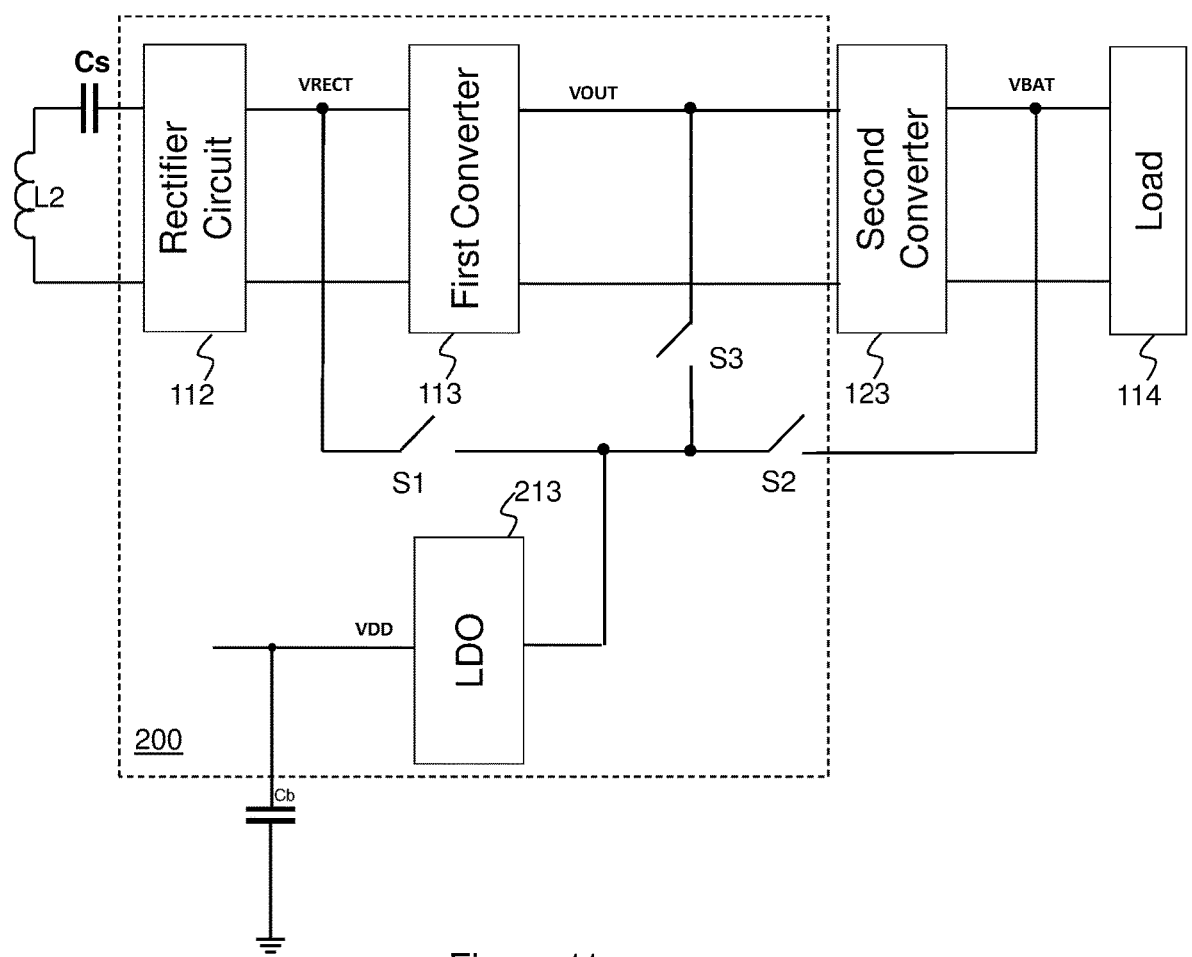
FIG. 11 illustrates a block diagram of a fifth implementation of the wireless charging system shown in FIG. 1 in accordance with various embodiments of the present disclosure.

FIG. 11 illustrates a block diagram of a fifth implementation of the wireless charging system shown in FIG. 1 in accordance with various embodiments of the present disclosure. The wireless charging system shown in FIG. 11 is similar to that shown in FIG. 10 except that one additional switch S3 has been employed to further improve the efficiency of the wireless charging system. The operation principle of the bias voltage source receiving power from three different sources has been described above with respect to FIG. 9, and hence is not discussed herein to avoid repetition.

Figure 12:
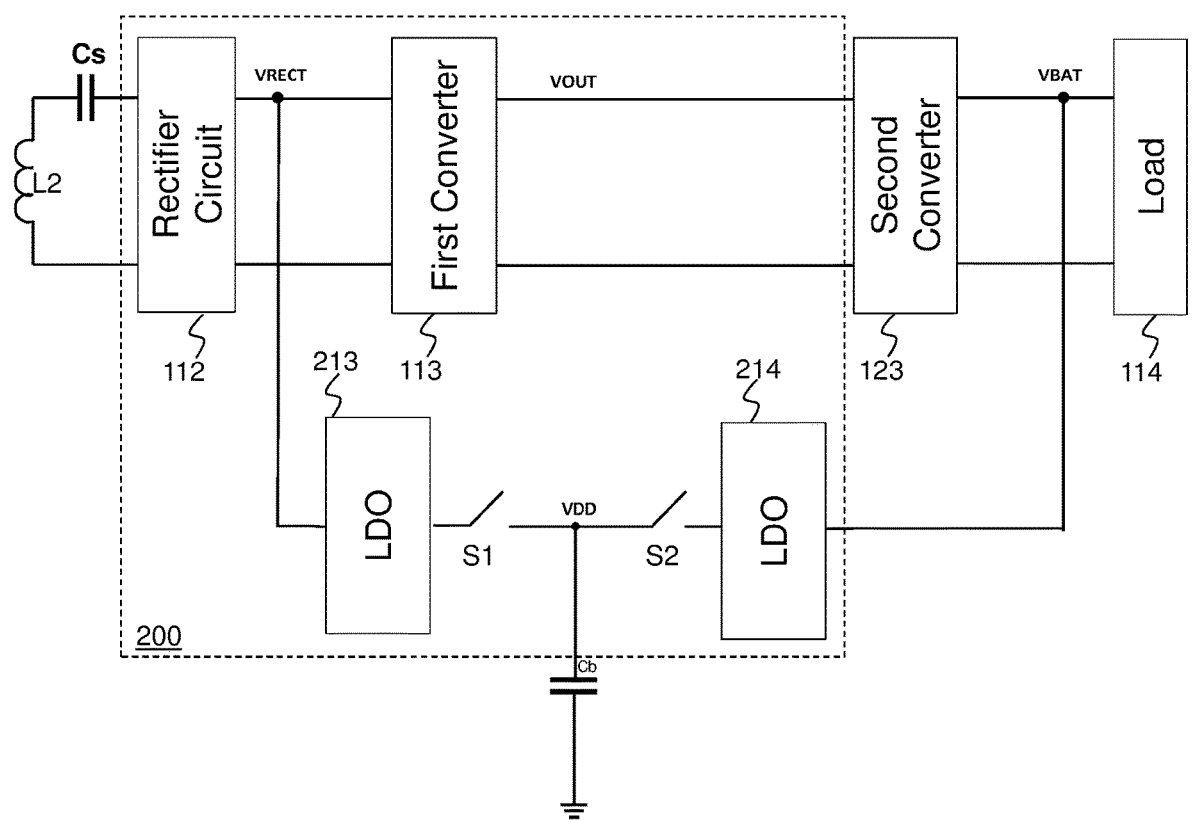
FIG. 12 illustrates a block diagram of a sixth implementation of the wireless charging system shown in FIG. 1 in accordance with various embodiments of the present disclosure.

FIG. 12 illustrates a block diagram of a sixth implementation of the wireless charging system shown in FIG. 1 in accordance with various embodiments of the present disclosure. The wireless charging system shown in FIG. 12 is similar to that shown in FIG. 2 except that one additional LDO 214 has been employed to further improve the performance of the wireless charging system. In some embodiments, the output voltage of the second converter 123 may be higher than the maximum voltage of the bias voltage source. The LDO 214 is employed to reduce the output voltage of the second converter 123 to a level suitable for the bias voltage source VDD.

Figure 13:
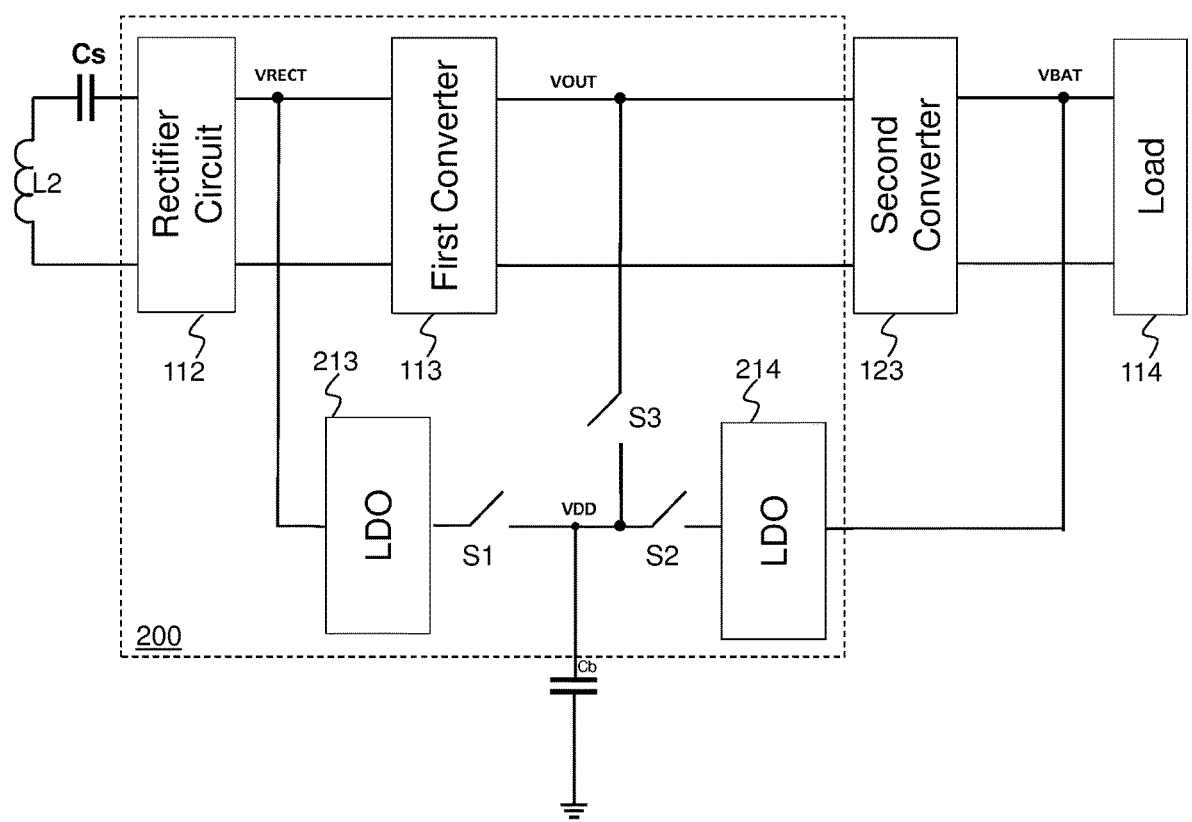
FIG. 13 illustrates a block diagram of a seventh implementation of the wireless charging system shown in FIG. 1 in accordance with various embodiments of the present disclosure.

FIG. 13 illustrates a block diagram of a seventh implementation of the wireless charging system shown in FIG. 1 in accordance with various embodiments of the present disclosure. The wireless charging system shown in FIG. 13 is similar to that shown in FIG. 12 except that one additional switch S3 has been employed to further improve the efficiency of the wireless charging system. The operation principle of a bias voltage source receiving power from three different sources has been described above with respect to FIG. 9, and hence is not discussed herein to avoid repetition.

Figure 14:
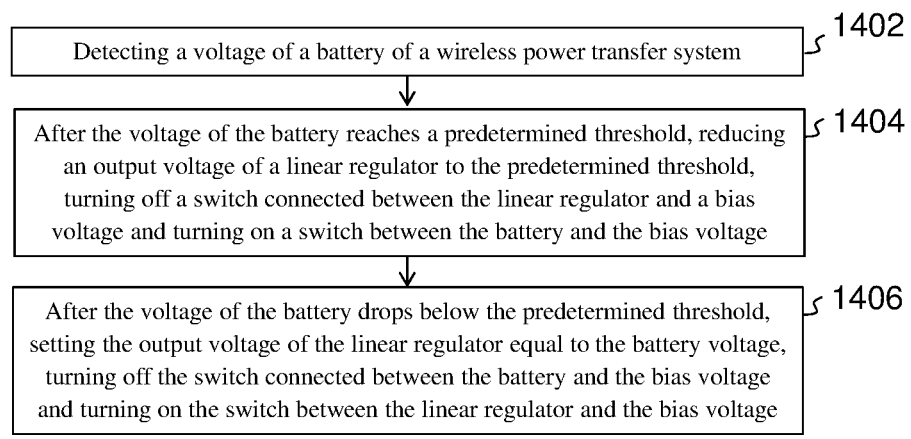
FIG. 14 illustrates a flow chart of applying a high efficiency control mechanism to the wireless charging system shown in FIG. 1 in accordance with various embodiments of the present disclosure.

FIG. 14 illustrates a flow chart of applying a high efficiency control mechanism to the wireless charging system shown in FIG. 1 in accordance with various embodiments of the present disclosure. This flowchart shown in FIG. 14 is merely an example, which should not unduly limit the scope of the claims. One of ordinary skill in the art would recognize many variations, alternatives, and modifications. For example, various steps illustrated in FIG. 14 may be added, removed, replaced, rearranged and repeated.

Referring back to FIG. 2, the wireless charging system comprises a rectifier configured to convert an alternating current voltage into a direct current voltage, a first power converter and a second power converter connected in cascade between a receiver coil and a battery. The bias voltage source of the receiver is supplied by two different power sources. An LDO and a first switch S1 is connected between the output of the rectifier and the bias voltage source. A second switch S2 is connected between the output of the second power converter and the bias voltage source. In operation, depending on the output voltage of the second power converter, the bias voltage source of the receiver is supplied either by the output of the rectifier or the output of the second power converter.

At step 1402, a plurality of operating parameters of the wireless charging system is detected by a plurality of sensing devices. The operating parameters include the voltage at the output of the wireless charging system. The output of the wireless charging system is connected to a battery. The detected operating parameters are processed by a controller.

At step 1404, during the startup process of the wireless charging system, the battery voltage is less than a predetermined threshold (e.g., 3.5 V). By default, the bias voltage source is supplied by the output of the rectifier. In other words, before the voltage across the battery reaches the predetermined threshold, the bias voltage source is supplied by the output of the rectifier. More particularly, the first switch is turned on, and the second switch is turned off. The power is delivered from the output of the rectifier to the bias voltage source through the LDO and the first switch.

After the voltage across the battery reaches the predetermined threshold, the output voltage of the LDO is reduced to a voltage level approximately equal to the predetermined threshold (e.g., 3.5 V), and then the first switch is turned off and the second switch is turned on. As a result of turning off the first switch and turning on the second switch, the power is delivered from the output of the second power converter to the bias voltage source.

The step of reducing the output voltage of the LDO to a voltage level approximately equal to the predetermined threshold helps to achieve a smooth transition, thereby improving the reliability of the wireless charging system.

At step 1406, before the voltage across the battery drops below the predetermined threshold, the bias voltage source is supplied by the output of the second power converter (VBAT). More particularly, the first switch is turned off, and the second switch is turned on. The power is delivered from the output of the second power converter to the bias voltage source through the second switch.

After the voltage across the battery drops below the predetermined threshold, the output voltage of the LDO is set to a voltage level approximately equal to the predetermined threshold, and then the first switch is turned on and the second switch is turned off. As a result of turning on the first switch and turning off the second switch, the power is delivered from the output of the rectifier to the bias voltage source.

The step of setting the output voltage of the LDO to a voltage level approximately equal to the predetermined threshold helps to achieve a smooth transition, thereby improving the reliability of the wireless charging system.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
 a rectifier configured to convert an alternating current voltage into a direct current voltage;
 a first stage and a second stage connected in cascade between the rectifier and a load; and
 a bias voltage source coupled to the rectifier through a first linear regulator and a first switch, and coupled to the load through a second switch.

2. The apparatus of claim 1, wherein:
 the first linear regulator and the first switch are formed by a first transistor and a second transistor back-to-back connected to each other; and
 the second switch is formed by a third transistor and a fourth transistor back-to-back connected to each other.

3. The apparatus of claim 1, wherein:
 the first stage is a step-down power converter configured to receive the direct current voltage generated by the rectifier; and
 the second stage is a charge pump power converter configured to function as a voltage divider.

4. The apparatus of claim 1, wherein:
 the first stage is a step-down power converter; and
 the second stage is an isolation switch.

5. The apparatus of claim 1, wherein:
 the first stage is a four-switch buck-boost power converter.

6. The apparatus of claim 1, wherein the first stage is a hybrid converter comprising:

a first switching element, a capacitor and a second switching element connected in series between an input of the hybrid converter and an output filter;
a third switching element connected between a common node of the first switching element and the capacitor, and a common node of the second switching element and the output filter; and
a fourth switching element connected between a common node of the capacitor and the second switch, and ground.

7. The apparatus of claim 1, wherein:
the first stage is a low dropout linear regulator.

8. The apparatus of claim 1, further comprising:
a third switch connected between an output of the first stage and the bias voltage source.

9. A method comprising:
detecting an output voltage of a wireless charging system, wherein the wireless charging system comprises a rectifier, a first power stage and a second power stage connected in cascade, and wherein an output of the wireless charging system is configured to be connected to a battery;
connecting a bias voltage source of the wireless charging system to a voltage potential higher than the output voltage of the wireless charging system when the output voltage of the wireless charging system is less than a first predetermined threshold; and
connecting the bias voltage source of the wireless charging system to the output voltage of the wireless charging system when the output voltage of the wireless charging system is greater than the first predetermined threshold.

10. The method of claim 9, further comprising:
during a startup process, connecting the bias voltage source of the wireless charging system to an output of the rectifier through a first linear regulator and a first switch when the output voltage of the wireless charging system is less than the first predetermined threshold, wherein the bias voltage source is supplied by the output of the rectifier; and
connecting the bias voltage source of the wireless charging system to the output voltage of the wireless charging system through a second switch when the output voltage of the wireless charging system is greater than the first predetermined threshold, wherein the bias voltage source is supplied by the output of the wireless charging system.

11. The method of claim 10, further comprising:
during the step of connecting the bias voltage source of the wireless charging system to the output of the rectifier, reducing an output voltage of the first linear regulator until the output voltage of the first linear regulator is substantially equal to a voltage of the bias voltage source; and
after the output voltage of the first linear regulator is substantially equal to the voltage of the bias voltage source, turning off the second switch between the bias voltage source and the output voltage of the wireless charging system and turning on the first switch between the first linear regulator and the bias voltage source.

12. The method of claim 10, further comprising:
during the step of connecting the bias voltage source of the wireless charging system to the output voltage of the wireless charging system, reducing an output voltage of the first linear regulator until the output voltage of the first linear regulator is substantially equal to the output voltage of the wireless charging system; and
after the output voltage of the first linear regulator is substantially equal to the output voltage of the wireless charging system, turning off the first switch between the first linear regulator and the bias voltage source and turning on the second switch between the bias voltage source and the output voltage of the wireless charging system.

13. The method of claim 9, further comprising:
connecting the bias voltage source of the wireless charging system to the output of the rectifier through a first linear regulator and a first switch when the output voltage of the first power stage is less than a second predetermined threshold, wherein the bias voltage source is supplied by the output of the rectifier;
connecting the bias voltage source of the wireless charging system to the output of the first power stage through a third switch when the output voltage of the first power stage is greater than the second predetermined threshold, and the output voltage of the wireless charging system is less than the first predetermined threshold, wherein the bias voltage source is supplied by the output of the first power stage; and
connecting the bias voltage source of the wireless charging system to the output voltage of the wireless charging system through a second switch when the output voltage of the wireless charging system is greater than the first predetermined threshold, wherein the bias voltage source is supplied by the output of the wireless charging system.

14. The method of claim 9, further comprising:
connecting the bias voltage source of the wireless charging system to an output of the rectifier through a first linear regulator and a first switch when the output voltage of the wireless charging system is less than the first predetermined threshold, wherein the bias voltage source is supplied by the output of the rectifier; and
connecting the bias voltage source of the wireless charging system to the output voltage of the wireless charging system through the first linear regulator and a second switch when the output voltage of the wireless charging system is greater than the first predetermined threshold, wherein the bias voltage source is supplied by the output of the wireless charging system.

15. The method of claim 9, further comprising:
connecting the bias voltage source of the wireless charging system to an output of the rectifier through a first linear regulator and a first switch when the output voltage of the wireless charging system is less than the first predetermined threshold, wherein the bias voltage source is supplied by the output of the rectifier; and
connecting the bias voltage source of the wireless charging system to the output voltage of the wireless charging system through a second linear regulator and a second switch when the output voltage of the wireless charging system is greater than the first predetermined threshold, wherein the bias voltage source is supplied by the output of the wireless charging system.

16. A system comprising:
a receiver coil configured to be magnetically coupled to a transmitter coil;
a rectifier connected to the receiver coil;
a first stage and a second stage connected in cascade between the rectifier and a load; and
a bias voltage source configured to be connected with a first voltage node through a first switch and a second voltage node through a second switch, wherein one of the first voltage node and the second voltage node supplies power to the bias voltage source.

17. The system of claim 16, wherein:
the bias voltage source is connected to an output of the rectifier through a first linear regulator and the first switch, and wherein the output of the rectifier is the first voltage node; and
the bias voltage source is connected to an output of the second stage through the second switch, and wherein the output of the second stage is the second voltage node.

18. The system of claim 17, wherein:
the first stage is a second linear regulator;
the second stage is a charger configured to charge a battery;
the first linear regulator and the first switch are formed by a first transistor and a second transistor back-to-back connected to each other; and
the second switch is formed by a third transistor and a fourth transistor back-to-back connected to each other.

19. The system of claim 18, wherein:
the first stage, the first linear regulator, the first switch and the second switch are in a same semiconductor chip.

20. The system of claim 18, wherein:
the second linear regulator is implemented as a transistor.

* * * * *